MAGNETIC RECORD BODY DRIVING MECHANISM

Filed Nov. 9, 1950 5 Sheets-Sheet 1

Edmund Barany
Melvin Sackter
INVENTORS
BY [signature]
[signature]
ATTORNEYS

Edmund Barany
Melvin Sackter
INVENTORS
BY [signature] [signature]
ATTORNEYS

Edmund Barany
Melvin Sackter
INVENTORS

BY

ATTORNEYS

Feb. 12, 1952

E. BARANY ET AL 2,585,724

MAGNETIC RECORD BODY DRIVING MECHANISM

Filed Nov. 9, 1950

5 Sheets-Sheet 4

Edmund Barany
Melvin Sackter
INVENTORS

BY

ATTORNEYS

Edmund Barany
Melvin Sackter
INVENTORS
BY [signatures]
ATTORNEYS

Patented Feb. 12, 1952 2,585,724

UNITED STATES PATENT OFFICE 2,585,724

MAGNETIC RECORD BODY DRIVING MECHANISM

Edmund Barany, Chicago, and Melvin Sackter, Arlington Heights, Ill., assignors to Ampro Corporation, Chicago, Ill., a corporation of Illinois Application November 9, 1950, Serial No. 196,134

13 Claims. (Cl. 74—207)

The present invention relates to mechanism for driving the elongate, flexible, magnetizable record bodies used in magnetic recording and/or reproducing instruments, for driving the record body past the magnetic head of the instrument. One aspect of the invention relates to mechanism that comprises a motor, a mounting for the motor and a mechanical system for transmitting driving power from the motor to a rotatable record body-driving element, all arranged in novel manner to prevent disadvantageous effects upon recording or reproducing quality of the instrument arising from characteristics of magnetic recording and/or reproducing instruments, the characteristics of elongate flexible record bodies, and the mechanical characteristics of constant speed motors used in such instruments for record body-driving purposes. The principal problems arising from these characteristics of constant speed motors used in such instruments for record body-driving purposes. The principal problems arising from these characteristics are acoustic pickup by the electronic amplifier system of motor vibration, and flutter of the record body as it passes the recording or pick-up head imparted to it by vibration of the motor and the elements of drive train from the motor to the record body-driving element, or flutter variation in the speeds of the motor shaft and transmission elements.

To rotate a record body-driving spindle that is stabilized by a flywheel rotating with it, it has been proposed to drive the spindle and flywheel from the periphery of the latter. To accomplish this drive the periphery of the flywheel is surrounded by a resilient tire and the tire periphery is frictionally driven from an electric motor output spindle. The tire, which is of some resilient material as rubber or a synthetic material having friction and resilience characteristics resembling those of a rubber, performs the triple functions of providing a friction surface for driven contact with the motor spindle, a resilient body for absorbing lateral vibrations of the motor, and an element of a mechanical filter of which the flywheel provides a second element, the mass of the flywheel being directly opposed to transmission to the record-driving spindle by the tire of minor flutter variations in the motor-spindle speed. To insure frictional contact between the motor spindle and tire adequate to drive the latter, the spindle is spring biased against the tire periphery, the motor being pivotally supported for swing of its spindle relative to the tire. The pressure exerted on the tire periphery by the motor spindle during extended idle periods of the instrument tends to form a transverse groove across the flywheel periphery, which upon subsequent operation, results in a highly objectionable thump at each flywheel rotation. A second aspect of the invention relates to mechanism for removing the spring-biased motor spindle from contact with the flywheel tire at each stopping actuation of the motor switch. This is accomplished by an actuating link that is moved by the switch operator in moving from an on to on off position, to swing the motor spindle away from the flywheel tire, but that is ineffective to interfere with the normal biasing of the motor spindle against the tire so long as the motor switch operator is in its on position.

Motor-control switches conventionally have detent means that tend to maintain the movable switch element in an on or off position to which it has been moved. Such conventional switch detent means have been found to be capable of maintaining the motor, of a drive mechanism arranged in accordance with this invention, with its drive spindle out of contact with the flywheel tire, so long as the instrument is stationary, and a dead center arrangement also may be used to prevent exertion of the biasing spring force directly against the switch biasing mechanism. Shocks and sudden movements, as encountered in transportation, frequently are sufficient to release the actuating link from its dead center condition, and to overcome the switch detent, so that an idle period following transportation of an instrument may result in production at a grooved flywheel tire. An additional aspect of the invention relates to a device, herein disclosed as used in conjunction with the switch operator-controlled actuating link, but having its own manual actuator and therefore being independently useful, for swinging the power assembly to a position wherein the motor spindle is spaced from the flywheel tire, and positively maintaining the power assembly in that position until the actuator is moved to release it.

A primary object is the provision of a novel arrangement for mounting a motor in a magnetic recording and/or reproducing instrument that includes means for absorbing motor vibration to prevent its transmission to the remainder of the instrument and particularly to the electronic system thereof.

Another object of the invention is the provision of a novel, unitary sub-assembly for mounting in a magnetic recording and/or reproducing instrument, such assembly including all mechanism necessary for drive and takeup of a magnetic record body.

An additional object is the provision of a novel vibration-absorbing motor mounting providing for swinging of the motor about an axis extended parallel to and laterally spaced from the axis of motor shaft rotation.

Still another object is to provide a novel actuator for a motor that is so pivotally mounted, and biased to maintain its output spindle in driving contact with a resilient tire on a flywheel, to swing the motor to remove its spindle from contact with the tire each time a motor switch is turned off, and to release the motor to establish the driving contact each time the switch is turned on.

A further object is to provide a novel lock device for positively securing a motor that is pivotally mounted and biased to maintain its output spindle in driving contact with such a flywheel tire, in a position wherein the motor spindle is spaced from the tire.

Figure 1:
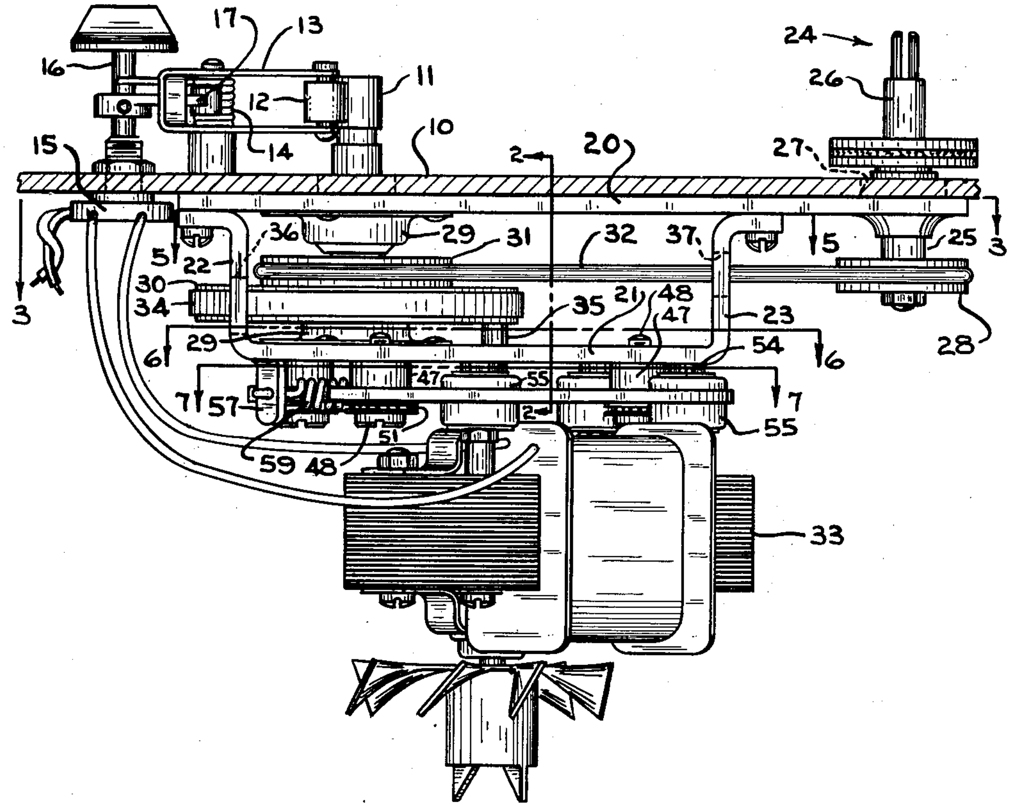
Fig. 1 is a fragmentary vertical section of a magnetic instrument, showing in elevation a record body-driving and takeup assembly arranged in accordance with the invention.
Figure 2:
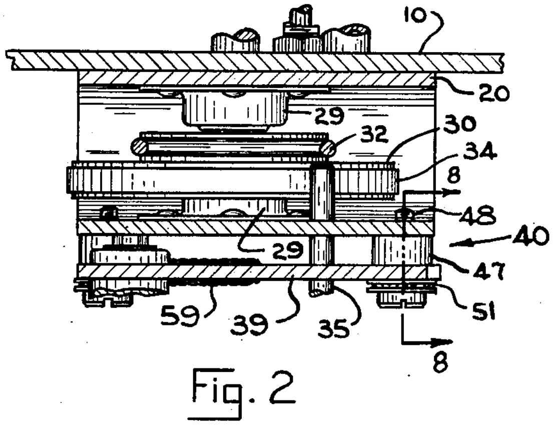
Fig. 2 is a transverse section on line 2—2 of Fig. 1.
Figure 3:
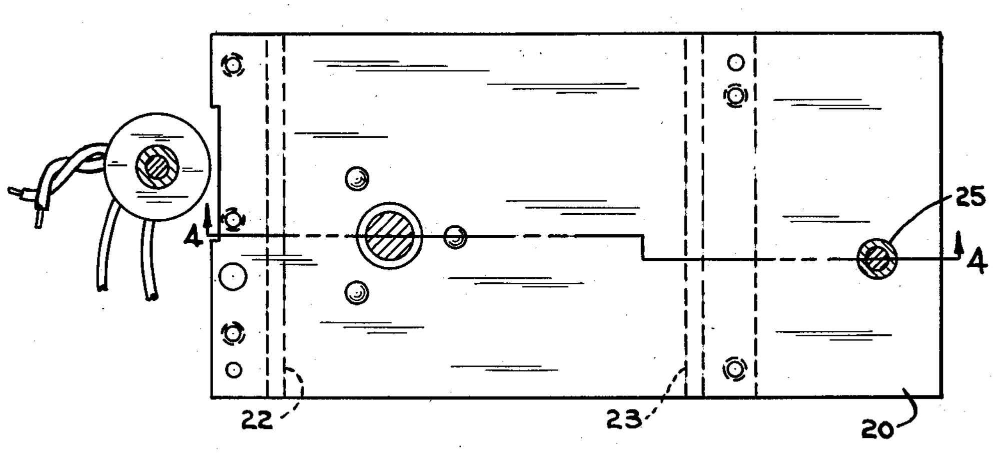
Fig. 3 is a section on line 3—3 of Fig. 1 showing the top plan of the assembly.
Figures 4, 8:
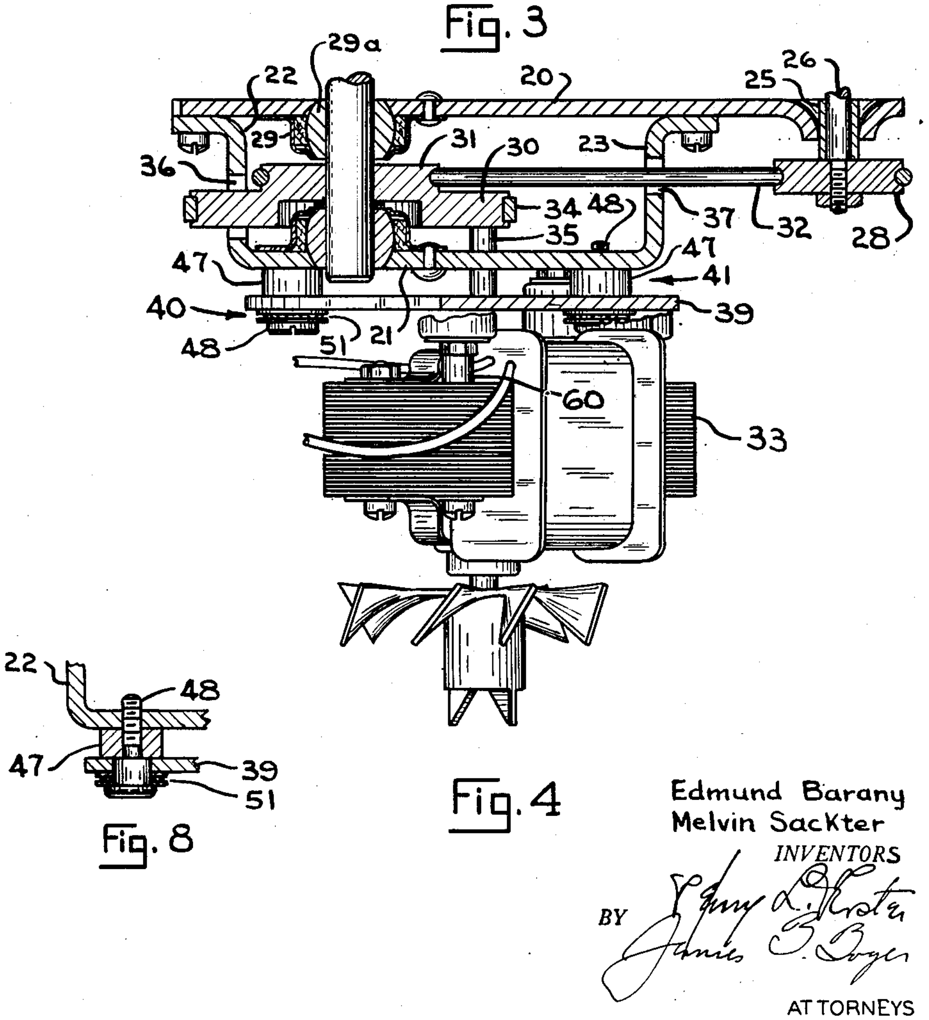
Fig. 4 is a longitulinal vertical section on line 4—4 of Fig. 3.
Fig. 8 is a detail section on line 8—8 of Fig. 2, showing the pivot motor mounting fixture.
Figures 10, 11, 12:
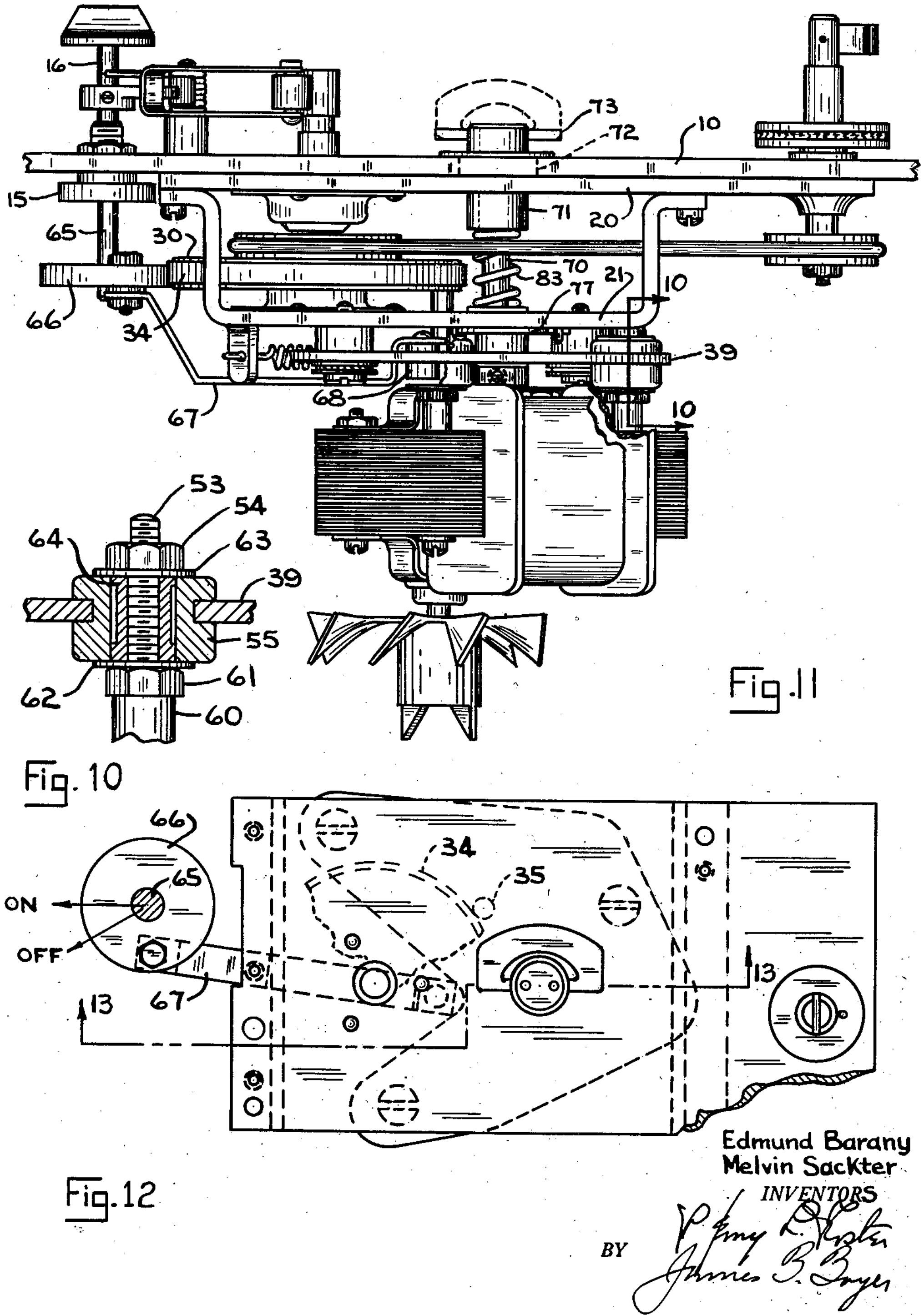
Fig. 10 is a detail section, on line 10—10 of Fig. 11, showing details of a specialized grommet assembly for vibration-absorbing support of a record body-driving electric motor.

Fig. 11 is a view similar to Fig 1, showing in side elevation a modified record body-driving assembly modified to include both means actuated by movement of the motor switch operator to on and off positions to swing the motor assembly respectively to flywheel-driving and non-driving positions wherein respectively its spindle is permitted to be biased against the flywheel and is maintained spaced from it, and an independent and manually actuated lock for securing the motor in its non-driving position.

Fig. 12 is a top plan of the assembly of Fig. 10.

Figure 13:
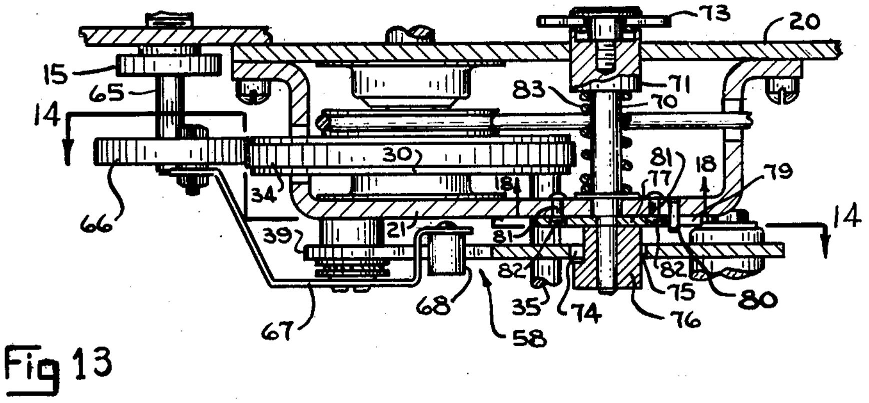

Fig. 13 is a section on line 13—13 of Fig. 12.

Figure 14:
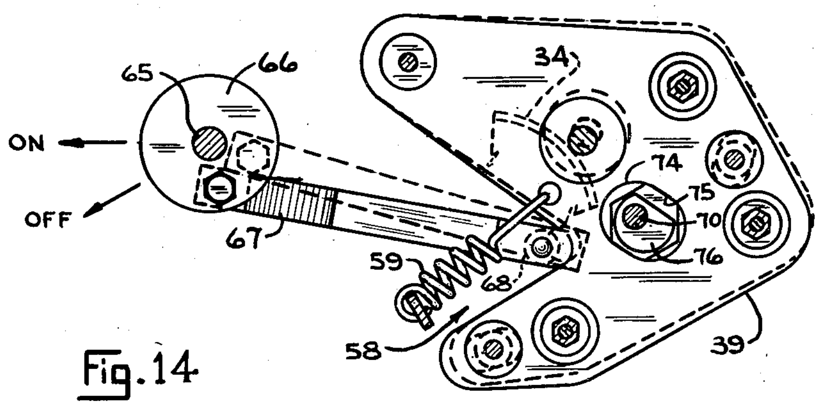

Fig. 14 is a section on line 14—14 of Fig. 13, showing the switch operator-actuated mechanism in the condition of the off position of the switch operator, and the manual lock in its non-effective condition.

Figure 15:
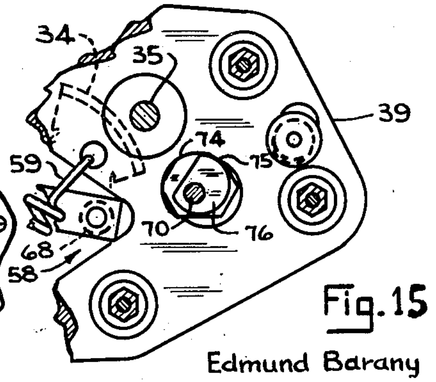

Fig. 15 is a view similar to Fig. 14 but showing the manual lock in its effective condition.

Figure 16:
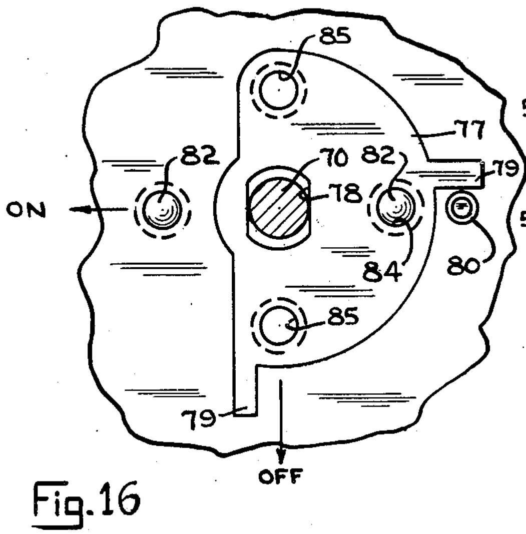

Fig. 16 is a section on line 16—16 of Fig. 13, showing an indexing detent for the manual lock.

Describing the drawings in detail, and first referring to Fig. 1, a magnetic recording and/or reproducing instrument comprises casing structure that includes a cover plate 10, which is shown as horizontally disposed. The instrument is provided with a rotatable record body-driving element, shown as a capstan roller 11 that advances a record body, typically of tape form, that is pressed against its surface by a pinch roll 12. Pinch roll 12 is carried by a bracket structure 13 that is pivotally mounted and biased by a spring 14 to urge roll 12 against roller 11 with sufficient pressure to assure drive of a record body trained between them. A motor switch 15 mounted on plate 10 is operated by a shaft 16, which also acts through linkage 17 to swing bracket structure 13 and pinch roll 12 between the advanced position shown and a retracted position withdrawn from roller 11 to permit record threading. Swinging of roll 12 between its advanced and retracted positions is correlated with movement of switch shaft 16 to motor "on" and "off" positions. The pinch roll bracket structure and actuating linkage 17 are disclosed and claimed in application for United States patent, Serial No. 194,915 filed November 9, 1950, by Edmund Barany and Melvin Sackter.

The assembly of the present invention includes an upper flat plate 20 that may be supported in suitable manner in underlying relation to instrument cover plate 10. A U-shaped lower plate 21 has a first side flange 22 secured to plate 20 along an end edge of the latter and a second side flange 23 secured to plate 20 between the end edges of the latter, so that a portion of plate 20 projects beyond flange 23. A takeup reel spindle assembly 24 is rotatably supported in a bearing 25 mounted in this projecting part of plate 20. Plates 20, 21 together form a rigid main structure for the unit.

The takeup assembly 24 includes a spindle 26 projecting above plate 20, and in the instrument projecting through a hole 27 in cover plate 10. A pulley 28 is secured to spindle 26 below plate 20.

A pair of bearing retainers 29 are mounted respectively on plates 20, 21 and support, in coaxial relation a pair of bearings 29*a* and the rotatable capstan assembly including roller 11 is rotatably supported in these bearings. The capstan assembly includes a flywheel 30 and a driver pulley 31, which are located between plates 20, 21, pulley 31 being lined up with takeup pulley 28 for driving the latter through a belt 32. Flywheel 30, in addition to functioning conventionally as an inertia speed-stabilizing device for capstan roller 11, acts as a driven element in a drive train from an electric motor 33 to capstan roller and takeup spindle assembly 24. For absorbing motor vibration and preventing its transmission to roller 11, as well as to provide a suitable friction surface, flywheel 30 is provided with a peripheral resilient tire 34 for driven friction contact with a motor driven spindle 35. Flywheel 30 may extend through an opening in flange 22 and belt 32 may pass through an opening in flange 23.

Spindle 35 preferably is an extension of the armature shaft of motor 33, and the motor is suspended by a system providing both for biased swinging to maintain spindle 35 in proper frictional driving contact with flywheel tire 34, and for absorption of motor vibration to prevent its transmission to plates 20, 21 and to the main structure of the instrument.

Figure 5:
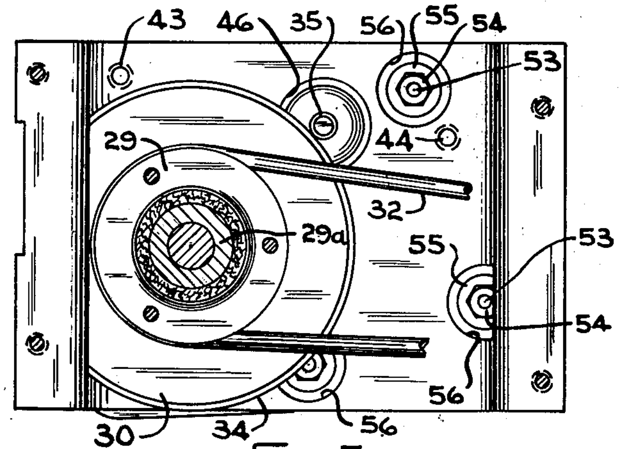
Fig. 5 is a horizontal section on line 5—5 of Fig. 1.
Figure 6:
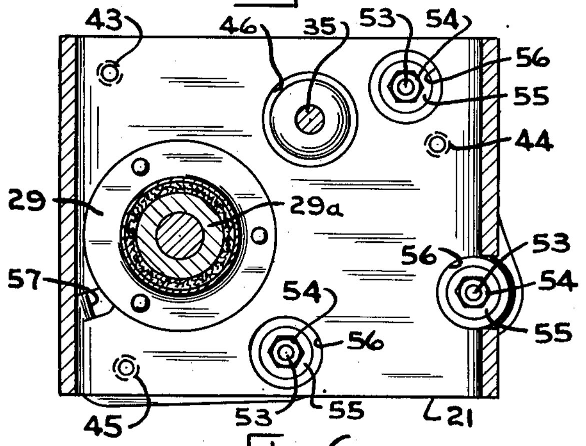
Fig. 6 is a horizontal section on line 6—6 of Fig. 1.

A motor-supporting plate 39 is suspended from plate 21 by three fixtures 40, 41, 42 that respectively are secured to plate 21 by means of holes 43, 44, 45 in the latter. These holes are located in a generally triangular relation about the axis of the capstan assembly and bearings 29 (see Figs. 5 and 6). Motor spindle 35 projects from below plate 39 through openings 46 in plates 39 and 21, in a location generally between holes 43 and 44, and to the opposite side of flywheel 30 from hole 43. The relative locations of hole 43 and motor spindle 35 suit the location of the axis of fixture 40, supported in hole 43, to use as a pivot axis about which spindle 35 is swingable for being biased into proper frictional driving contact with flywheel tire 34.

Each of the pivot fixture 40 and the fixtures 41, 42 comprises a spacer collar 47 that is secured to plate 21 by a bolt 48 that is threaded into hole 43, 44 or 45, and the lower end of collar 47 slidably contacts the upper surface of plate 39. Bolt 48 of fixture 40 penetrates a matching round hole 49 in plate 39, forming therewith a pivot support. The bolts 48 of fixtures 41, 42 penetrate clearance openings 50 in plate 39. Washer devices 51 supported on the heads of bolts 48 afford sliding support to the under surface of plate 39 about hole 49 and clearance openings 50.

Motor 33 is suspended from and below plate 39 by three bolts 53 that are rigidly secured in the motor structure and have their upper ends supported by nuts 54 resting on the upper surfaces of resilient grommets 55 that are engaged in openings in plate 39. Plate 21 has openings 56 that provide clearance for parts of the bolt, nut and grommet assemblies that project above plate 39.

Figure 7:
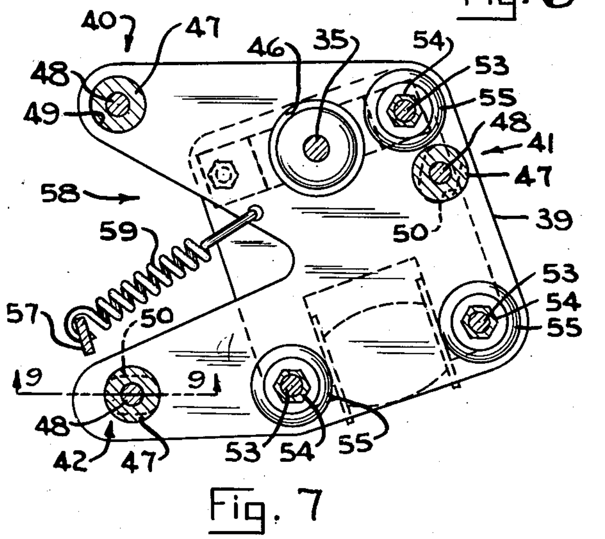
Fig. 7 is a horizontal section on line 7—7 of Fig. 1.
Figure 9:
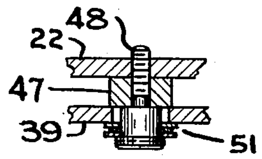
Fig. 9 is a detail sectional view on the plane of line 9—9 of Fig. 7, showing a motor mounting fixture that permits swinging about the pivot fixture of Fig. 8.

Plate 21 has struck out from it a downwardly projecting tongue 57 that extends into a clearance cove 58 of plate 39 (see Fig. 7), and is properly located to provide a fixed anchor for one end of a spring 59 that has its other end secured to plate 39 at a point suitable for biasing the swinging motor assembly to urge motor spindle 35 against flywheel tire 34 with proper pressure for friction drive of the capstan assembly.

The above-described arrangement provides a complete, self-contained record driving and take-up unit for mounting in a magnetic recording and/or reproducing instrument. The resilient grommets 55 supported by plate 39 and suspending motor 33 prevent transmission of motor vibration through plate 39, and the pivotal support of the latter from the rigid structure carrying the capstan assembly permits proper biasing of the spindle of the resiliently suspended motor into frictional driving relation with flywheel tire 34. The drive of the capstan assembly by direct contact of the motor spindle with the peripheral surface of the flywheel provides a transmission that is simple and inexpensive as compared to prior transmissions employing idler or belt and pulley trains to a spindle provided with a flywheel driven through the spindle and having only the function of inertia stabilization of spindle speed. The interposition between the flywheel and the motor spindle of a resilient tire, as flywheel tire 34, not only provides for adequate friction for driving, but additionally provides a resilient, mechanical filtering connection that permits the flywheel inertia to maintain a constant speed regardless of vibrations or flutter of the motor spindle.

Fig. 10 shows in section the details of a specialized form of assembly that includes a grommet 55, for suspending motor 33 from its pivoted supporting plate 39. From Fig. 10 it will be seen that the motor-supporting bolts 53 comprise elements of hangers that also include spacer tubes 60 surrounding the bolts and bearing against top surfaces of the motor, nuts 61 that are threaded on bolts 53 above tubes 60 to tighten them against the motor surfaces, and washers 62 that provide surfaces contacting the under sides of grommets 55. Washers 63 underlie nuts 54 and provide surfaces contacting the opposite surfaces of grommets 55.

In development of the resilient grommet assembly for vibration-absorbing support of motor 33, it was discovered that compression of the grommet between washers 62, 63 by forcing the latter toward the former, impairs the vibration-absorbing quality of the grommet. To prevent such compression, and thereby insure that compression of the grommet material is only by the motor weight, so that the motor is supported by shear resistance of the grommet material in its closest possible approach to optimum vibration-absorbing condition, spacer structures are arranged inside the grommets to provide stop surfaces that limit approach of the grommet-contacting surfaces of washers 63 to the grommet-contacting surfaces of washers 62 to a distance substantially equal to the corresponding dimension of the grommets when they are in uncompressed condition. Such a spacer structure is shown in Fig. 10 as a spacer tube 64 surrounding bolt 63 in the grommet and providing end surfaces respectively butting against the grommet-contacting surfaces of washers 62, 63.

Figs. 11 to 16 disclose switch operator-actuated means for swinging the motor to a non-driving position, wherein motor spindle 35 is spaced from flywheel tire 34, when the motor switch is opened, and releasing the motor when the switch is turned on, for biasing of spindle 35 into its normal pressure-exerting friction driving contact with the tire. Switch operator shaft 16 is provided with an extension 65 that projects below switch 15 and carries secured to it an actuator flange 66. Pivotally attached to flange 66 in eccentric relation to shaft extension 65 is one end of an actuator link 67. Link 67 is supported solely by the mounting of its pivoted end to flange 66, and at its free second end it carries a buffer element 68 that is disposed in clearance cove 58 of plate 39. The angular position of the pivot connection of link 67 to flange 66 is so related to the angular position of switch shaft 16 that in the on position of shaft 16 the link occupies the retracted position shown in Fig. 13 and in full lines in Fig. 14, with element 68 spaced from the edge surfaces of plate 39 that define cove 58. With rotation of switch shaft 16 to its off position, link 67 moves element 68 into the apex of cove 58 and swings motor plate 39 counterclockwise to the dotted line position of Fig. 14, wherein motor spindle 35 is spaced from the periphery of flywheel tire 34. Advantageously the radial spacing and angular position of the pivot axis between link 67 and flange 66 are so related to the angular distance between, and the locating of the off and on positions of switch shaft 16 that a dead center condition occurs between plate 39, link 67 and shaft extension 65 when the latter is in its off position, as suggested by the dotted line representation of link 67 in Fig. 14.

In addition to the switch operator-actuated means described above, Figs. 11 to 16 disclose an independent device for swinging the power assembly to a non-driving position, with motor spindle 35 spaced from the periphery of flywheel tire 34, or for locking the power assembly when in that position against release and swinging by the bias spring 59. The provision of such a locking device in an instrument also provided with the mechanism above described is desirable to prevent shocks or sudden movements, as encountered in transportation, from overcoming the off position detent of switch 15 and dislodging the dead center condition of link 47, thereby permitting bias spring 59 to swing motor spindle 35 into pressure-exerting contact with flywheel tire 34.

The lock in question comprises a shaft 70 journalled in the lower main assembly plate 21 and having a head 71 journalled in the upper plate 20 and extended above it for projecting through a hole 72 in an instrument cover plate, as 10. Head 71 carries a hand knob or key 73, which may be pivoted as indicated in Fig. 11 for folding to an out-of-the-way position. Shaft 70 projects below the lower plate 21 and through an opening 74 in motor support plate 39 that provides a follower edge 75. Registered with edge 75 for cooperation therewith and disposed in opening 74 is an eccentric cam 76 which is secured to shaft 70 and rotatable with it from the inactive position of Fig. 14, wherein cam 76 is spaced from edge 75 to permit bias spring 59 to urge motor spindle 35 against tire 34, to the active position of Figs. 13 and 15 wherein the cam, by contact with edge 75, maintains motor plate 39 in a swung out position wherein spindle 35 is spaced from tire 34.

Cam 76 preferably is so angularly related to shaft 70 and follower edge 75, and follower edge 75 is so angularly disposed relative to its path of swing with motor plate 39 and the location of shaft 70, that a dead center relation exists between edge 75, cam 76 and shaft 70 when the cam is in its active position.

To secure shaft 70 and cam 76 in active condition against shocks and sudden movements, but to permit ready release by manual turning of shaft 70 from its locking position, a detent system is provided that is of specialized form to present strong resistance to release by jarring or sudden movements, but readily overcome by torque applied to shaft 70. The movable detent element comprises a plate 77 penetrated by shaft 70 and secured to it for corresponding rotation, as by meeting flats of the shaft and edges of the plate shown at 78 in Fig. 16. Plate 77 has a pair of angularly spaced projections 79 that cooperate with a pin 80 that projects from support plate 21 to limit opposite rotation of shaft 70 and cam 76 to the two positions shown in Figs. 14 and 15. Indexing projections and recesses are carried by one and the other of plates 21, 77. As shown, the projections are provided by rivets 81 secured in plate 21 in diametric opposition relative to shaft 70 and having rounded heads 82 projecting from the under side of plate 21. A compression spring 83 bears oppositely on the upper surface of support plate 21 and the inner surface of shaft head 71, urging detent plate 77 toward the under surface of support plate 21. Detent plate 77 is provided with a hole 84 that registers with the head 82 of one rivet 81 when the shaft and cam assembly 70, 76 is in its inactive position, shown in Figs. 14 and 16, and a pair of holes 85 one of which registers with each rivet head 82 when the shaft and cam assembly is in its active position, shown in Figs. 13 and 15. The walls of holes 84, 85 preferably are axially contoured to match the rivet heads as suggested by the dotted lines of Fig. 16 and by Fig. 13. Spring 83 serves to maintain a secure engagement of the rivet head or heads in holes 84 or 85 with which they are registered, but manual rotation of shaft 70 readily releases such engagement by camming action between the rounded rivet heads and contoured hole walls.

From the foregoing description and explanations, the principles and advantages of the invention will be understood, and it will be apparent that many changes may be made from the specific arrangements disclosed within the scope of the invention as defined by the claims.

We claim:

1. In a magnetic recording and/or reproducing instrument that comprises mechanism for driving an elongate flexible record body including a rotatable element and an electric motor having an output spindle, said mechanism being convertible between record body-driving and idle conditions, a wheel that is rotatable to drive said rotatable element and a resilient tire mounted about its periphery, means mounting said motor with its output spindle parallel to the axis of rotation of said wheel and for swinging about a pivot axis disposed parallel to and spaced from the axes of rotation of said wheel and spindle for movement of the latter toward and away from the periphery of said tire, and spring means biasing the motor about said pivot axis in a direction to urge said spindle into pressure-exerting contact with said tire periphery; a shaft manually rotatable between two preselected positions, means actuable by said shaft for converting said mechanism between its record body-driving and idle conditions by rotation of said shaft between its two said positions, and means coupled eccentrically with said shaft and actuable by its rotation to said positions respectively to swing said motor to a position wherein its spindle is spaced from said tire periphery when said shaft is moved to its position to convert said mechanism to its idle condition and to release said motor for urging of its spindle against the tire by said biasing spring means when said shaft is rotated to its other said position.

2. In a magnetic recording and/or reproducing instrument that comprises a rotatable element for driving an elongate flexible record body, a pinch roll that is movable into and out of pressure-exerting relation to said element, a power assembly including an electric motor having an output spindle, a wheel that is rotatable to drive said rotatable element and a resilient tire mounted about its periphery, means mounting said motor with its output spindle parallel to the axis of rotation of said wheel and for swinging about a pivot axis disposed parallel to and spaced from the axes of rotation of said wheel and spindle for movement of the latter toward and away from the periphery of said tire, and spring means biasing the motor about said pivot axis in a direction to urge said spindle into pressure-exerting contact with said tire periphery; a shaft located in spaced relation to and mounted parallel to said pivot axis for manual rotation between two preselected positions, means including a mechanical connection between said pinch roll and shaft for moving the former to and from its said pressure-exerting relation during movement of said shaft between its said positions, eccentric means secured to and rotatable with said shaft and disposed for cooperation with said power assembly to swing said motor, by rotation of said shaft to its said position wherein said pinch roll is removed from its said pressure-exerting relation, to a non-driving position wherein its spindle is spaced from said tire periphery and, by rotation of said shaft to its other position, to release said motor for swinging by said biasing spring.

3. In a magnetic recording and/or reproducing instrument that comprises a rotatable element for driving an elongate flexible record body, an electric motor for rotating said element and having an output spindle, and a switch controlling operation of said motor and having an operator movable between predetermined positions respectively effective to maintain said motor stopped and in operation; a wheel that is rotatable to drive said rotatable element and having a resilient tire about its periphery, means mounting said motor with its output spindle parallel to the axis of rotation of said wheel and for swinging about a pivot axis spaced from and parallel to the axes of rotation of said spindle and wheel for movement of the former toward and away from the periphery of said tire, spring means biasing the motor about said pivot axis in a direction to urge said spindle into pressure-exerting contact with said tire periphery, and mean operatively connected with said switch operator and actuable by movement of the latter to its motor-stopped position to swing the motor about said pivot axis to a position wherein said spindle is spaced from said tire periphery, and by movement of said operator to its motor-operation position to release said motor for swinging by said spring bias means to urge said spindle into pressure-exerting contact with said tire periphery.

4. In a magnetic recording and/or reproducing instrument that comprises a rotatable element for driving an elongate flexible record body, an electric motor for driving said rotatable element and having an output spindle, and a switch controlling said motor and having an operator shaft rotatable between two predetermined positions respectively effective to maintain said motor stopped and in operation; a wheel that is rotatable to drive said rotatable element and a resilient tire mounted about its periphery, a plate secured to said motor in transverse relation to the axis of rotation of its spindle, means supporting said plate with the axis of rotation of said motor spindle parallel to the axis of rotation of said wheel and for swinging about a pivot axis spaced from the axes of rotation of said wheel and motor spindle for movement of the latter toward and away from the periphery of said tire, spring means biasing said plate about said pivot axis to maintain the motor spindle in pressure-exerting contact with said tire periphery, eccentric means mounted on said switch operator shaft, and a link connected to said eccentric means and movable, by rotation of said switch operator shaft from its motor-operation to its motor-stopped position, from a position out of contact with said plate to contact it and swing it about said pivot axis to retracted position wherein said motor spindle is spaced from said tire periphery.

5. In a magnetic recording and/or reproducing instrument that comprises a rotatable element for driving an elongate flexible record body, an electric motor for driving said rotatable element and having an output spindle, and a switch controlling said motor and having an operator shaft located in spaced relation to said rotatable element and rotatable between two positions respectively effective to maintain said motor stopped and in operation; a wheel that is rotatable to drive said rotatable element and a resilient tire mounted about its periphery, a plate secured to said motor in transverse relation to the axis of rotation of its spindle, means supporting said plate with the axis of rotation of said motor spindle parallel to the axis of rotation of said wheel and for swinging about a pivot axis spaced from and parallel to the axes of rotation of said switch operator shaft, wheel and motor spindle for movement of the latter toward and away from the periphery of said tire, spring means biasing said plate about said pivot axis to maintain the motor spindle in pressure-exerting contact with said tire periphery, eccentric means mounted on said switch operator shaft, and a link connected to said eccentric means and movable, by rotation of said switch operator shaft from its motor-operation to its motor stopped position, from a position out of contact with said plate to contact and swing it about said pivot axis to a retracted position wherein said motor spindle is spaced from said tire periphery, said pivot axis, switch operator shaft, eccentric means, plate and link being relatively disposed to establish a dead center relation between said shaft, link and plate when said shaft is in its motor-stopped position.

6. In a magnetic recording and/or reproducing instrument that comprises a rotatable element for driving an elongate flexible record body, and an electric motor having an output spindle; a wheel that is rotatable to drive said rotatable element and a resilient tire mounted about its periphery, a power assembly including a motor having an output spindle and means mounting said power assembly with said motor spindle disposed parallel to the axis of rotation of said wheel and for swinging about a pivot axis parallel to and spaced from the axes of rotation of said wheel and spindle for movement of the latter toward and from the periphery of said tire, an actuator manually movable between two positions, and a thrust member having a surface for contacting a surface of said power assembly, said thrust member being movable by movement of said actuator between its said positions from a position wherein said member surface is spaced from said power assembly surface to a position wherein said thrust member maintains the power assembly in a position wherein said motor spindle is spaced from said tire periphery.

7. In a magnetic recording and/or reproducing instrument that comprises a rotatable element for driving an elongate flexible record body, and an electric motor having an output spindle; a wheel that is rotatable to drive said rotatable element and a resilient tire mounted about its periphery, a plate secured to said motor in transverse relation to the axis of rotation of its spindle, means supporting said plate with the axis of rotation of said wheel and for swinging about a pivot axis spaced from and parallel to the axes of rotation of said wheel and motor spindle for movement of the latter toward and away from the periphery of said tire, spring means biasing said plate about said pivot axis to maintain the motor spindle in pressure-exerting contact with said tire periphery, an actuator shaft manually rotatable between two preselected positions, and a cam rotatable by rotation of said actuator shaft between said preselected positions from a first position spaced from a contact surface of said plate to a second position bearing against said surface and maintaining said plate in a position wherein said motor spindle is spaced from contact with said tire periphery.

8. In a magnetic recording and/or reproducing instrument that comprises a rotatable element for driving an elongate flexible record body, and an electric motor having an output spindle; a fixed support plate, a wheel supported by said plate and rotatable to drive said rotatable element and a resilient tire mounted about its periphery, a motor-supporting plate pivoted to said fixed plate for swinging about a pivot axis disposed parallel to and spaced from the axis of rotation of said wheel, means mounting said motor on said motor-supporting plate with its output spindle disposed parallel to said axis of wheel rotation and for movement of said spindle toward and away from the periphery of said tire by swinging of the motor-supporting plate, spring means effective between said plates to urge said motor spindle into pressure-exerting contact with the periphery of said tire, an actuator shaft supported by said fixed plate for manual rotation between two angularly spaced preselected positions, and a cam rotatable between two predetermined positions by rotation of said actuator shaft between its said positions, said cam having an eccentric surface disposed for cooperation with an edge of said motor-supporting plate and contoured to be spaced from said plate edge in one of said positions of the cam and by contact with said edge in the other said position of the cam to maintain said motor-supporting plate in a position wherein said motor-spindle is spaced from said tire periphery.

9. In a magnetic recording and/or reproducing instrument that comprises a rotatable element for driving an elongate flexible record body, and an electric motor having an output spindle; a fixed support plate, a wheel supported by said plate and rotatable to drive said rotatable element and a resilient tire mounted about its periphery, a motor-supporting plate pivoted to said fixed plate for swinging about a pivot axis disposed parallel to and spaced from the axis of rotation of said wheel, means mounting said motor on said motor-supporting plate with its output spindle disposed parallel to said axis of wheel rotation and for movement of said spindle toward and away from the periphery of said tire by swinging of the motor-supporting plate, spring means effective between said plates to urge said motor spindle into pressure-exerting contact with the periphery of said tire, an actuator shaft supported by said fixed plate for axial movement and for manual rotation, stop means carried respectively by said shaft and fixed plate for limiting opposite rotation of the shaft to two preselected positions, detent means carried respectively by said shaft and plate and engageable and releasable by axial movement of said shaft when in its said positions, and a cam rotatable by said shaft between two positions respectively determined by said preselected shaft positions, said cam having an eccentric surface disposed for cooperation with an edge of said motor-supporting plate and contoured to be spaced from said plate edge in one of said positions of the cam and by contact with said edge in the other said position of the cam to maintain said motor-supporting plate in a position wherein said motor spindle is spaced from said tire periphery.

10. In a magnetic recording and/or reproducing instrument that comprises a rotatable element for driving an elongate flexible record body, and an electric motor having an output spindle, a fixed support plate, a wheel supported by said plate and rotatable to drive said rotatable element and a resilient tire mounted about its periphery, a motor-supporting plate pivoted to said fixed plate for swinging about a pivot axis disposed parallel to and spaced from the axis of rotation of said wheel, means mounting said motor on said motor-supporting plate with its output spindle disposed parallel to said axis of wheel rotation and for movement of said spindle toward and away from the periphery of said tire by swinging of said motor-supporting plate, spring means effective between said plates to urge said motor spindle into pressure-exerting contact with said tire, an actuator shaft supported by said fixed plate for axial movement and for manual rotation, a stop and detent plate carried by said shaft in facing relation to a surface of said fixed plate and movable toward and away from said surface by axial movement of said shaft, a spring biasing said shaft and the detent and stop plate axially of the former and to urge the latter toward said plate surface, said fixed plate and said detent and stop plate having means providing stop surfaces relatively disposed to stop opposite rotation of the shaft in two preselected positions, said fixed plate and said detent and stop plate having cooperative detent elements that are engageable by axial movement of said stop and detent plate toward said fixed plate when the shaft is in its said positions and said detent elements having cooperative cam surfaces for releasing their engagement as the shaft is turned from said positions, and a cam rotatable by said shaft between two positions respectively determined by said shaft positions, said cam having an eccentric surface disposed for cooperation with an edge of said motor-supporting plate and contoured to be spaced from said plate edge in one of said cam positions and by contact with said edge in the other said position of the cam to maintain said motor-supporting plate in a position wherein said motor spindle is spaced from said tire periphery.

11. A record body-driving assembly for a magnetic recording and/or reproducing instrument, said assembly comprising a supporting structure including a pair of fixed spaced plates having facing inner surfaces and outer surfaces, rotatable means comprising in coaxial relation a spindle extended between and rotatably supported by both said plates, a record body-driving element projecting beyond the outer surface of a first of said plates and a fly-wheel positioned between said plates, a motor-supporting plate facing the outer surface of the second said fixed plate and pivotally mounted to said second plate for swinging about a pivot axis spaced from and disposed parallel to the axis of rotation of said rotatable means, an electric motor having an output spindle and secured to said motor-supporting plate with said output spindle disposed parallel to said axis of rotation, extended axially through holes in said motor-supporting and second fixed plates into registration with the periphery of said wheel, and for lateral movement toward and from said periphery by swinging of said motor-supporting plate, a resilient tire mounted about the periphery of said wheel, spring means effective between said supporting structure and motor-supporting plate to bias said motor spindle into pressure-exerting contact with the periphery of said tire, a manually rotatable actuator shaft extended between and rotatably supported by said fixed plates and projecting beyond the outer surface of the first thereof, cooperative means carried respectively by said shaft and said supporting structure for limiting opposite rotation of said shaft to two angularly spaced preselected positions, detent devices respectively carried by said shaft and supporting structure and releasably engageable in said preselected shaft positions to restrain rotation of said shaft, and a cam member secured to said shaft and having a portion projecting into a hole in said motor-supporting plate, said member having an eccentirc surface lying in said hole for cooperation with an edge that defines it, said surface being contoured to be spaced from said edge in one of said shaft positions and by contact with it in the other said position to maintain said motor-supporting plate in a position wherein said motor spindle is spaced from said tire periphery.

12. A record body-driving assembly according to claim 11, wherein said actuator shaft is axially movable, a stop and detent plate is secured to said shaft between the outer surface of said second fixed plate and the motor-supporting plate, a spring is arranged to bias said shaft axially in a direction to urge the detent and stop plate toward said second fixed plate, said rotation-limiting means comprise surfaces respectively provided by said stop and detent plate and carried by said second fixed plate in relative disposition to contact each other in said preselected shaft positions, and said cam devices comprise respectively rounded projections from one and matching recesses in the other of said second fixed plate and said stop and detent plate, said recesses and projections being relatively arranged for registration and engagement by axial movement of said shaft when in its preselected positions.

13. In a magnetic recording and/or reproducing instrument that includes mechanism that is convertible between operating and idle conditions, a controller for said mechanism that is movable between two positions wherein respectively it is effective to maintain said mechanism in its operating conditions, a record body-driving capstan assembly including a flywheel having a resilient peripheral tire, a motor having an output spindle and means pivotally supporting said motor with said spindle parallel to the axis of said flywheel and for lateral movement of said spindle to and from contact with said tire, and spring means biasing said motor toward pressure-exerting contact of said spindle against said tire; a common actuator movable between two positions, and means linking said actuator with said mechanism controller and with said motor for simultaneously moving said actuator to its position wherein it is effective to maintain said mechanism in idle condition and swinging said motor to remove its spindle from contact with said flywheel tire, and for releasing said motor and moving said controller to its other said position during movement of said actuator to its other said position.

EDMUND BARANY.
MELVIN SACKTER.

REFERENCES CITED

The following references are of record in the file of this patent:

UNITED STATES PATENTS

| Number | Name | Date |
|---|---|---|
| 2,254,066 | Gruber et al. | Aug. 26, 1941 |
| 2,438,265 | Metzner | Mar. 23, 1948 |
| 2,490,667 | Boyd, Jr. | Dec. 6, 1949 |

FOREIGN PATENTS

| Number | Country | Date |
|---|---|---|
| 665,144 | France | Apr. 30, 1929 |